United States Patent
He

(10) Patent No.: US 9,374,586 B2
(45) Date of Patent: *Jun. 21, 2016

(54) VIDEO INFORMATION PROCESSING SYSTEM WITH SELECTIVE CHROMA DEBLOCK FILTERING

(71) Applicant: NORTH STAR INNOVATIONS INC., Costa Mesa, CA (US)

(72) Inventor: Zhongli He, Austin, TX (US)

(73) Assignee: NORTH STAR INNOVATIONS INC., Costa Mesa, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/639,762

(22) Filed: Mar. 5, 2015

(65) Prior Publication Data

US 2015/0181211 A1 Jun. 25, 2015

Related U.S. Application Data

(63) Continuation of application No. 11/532,417, filed on Sep. 15, 2006, now Pat. No. 9,001,899.

(51) Int. Cl.
*H04N 7/12* (2006.01)
*H04N 11/02* (2006.01)
(Continued)

(52) U.S. Cl.
CPC ........... *H04N 19/117* (2014.11); *H04N 19/119* (2014.11); *H04N 19/136* (2014.11);
(Continued)

(58) Field of Classification Search
CPC .............................. H04N 19/119; H04N 19/86
USPC ..................................... 375/240.29
See application file for complete search history.

(56) References Cited

U.S. PATENT DOCUMENTS

| 6,160,503 | A | 12/2000 | Andrews |
| 7,535,961 | B2 | 5/2009 | Cho et al. |

(Continued)

FOREIGN PATENT DOCUMENTS

| EP | 1507415 A2 | 2/2005 |
| KR | 1020050009226 | 1/2005 |
| WO | WO2004093330 A2 | 10/2004 |

OTHER PUBLICATIONS

Weigand, Thomas et al. "Draft ITU-T Recommendation and Final Draft International Standard of Joint Video Specification (ITU-T Rec.H.264 | ISO/IEC 14496-10 AVC)" Mar. 14, 2003. pp. 61 and 138-147.

(Continued)

*Primary Examiner* — Jeremaiah C Hallenbeck-Huber
(74) *Attorney, Agent, or Firm* — Gary Stanford; Huffman Law Group, PC

(57) ABSTRACT

A video information processing system including a processing circuit and a deblocking filter. The processing circuit provides video information including a chroma component and a luma component. The deblocking filter has an input receiving the video information and an output providing filtered video information, and is configured to selectively disable chroma deblock filtering while luma deblock filtering is enabled. The processing circuit may include a video encoder or a video decoder. The processing circuit may further include control logic providing a control signal to disable chroma deblock filtering within either or both the encoder and decoder. The video encoder may incorporate control information in the output bitstream to control deblock filtering in the downstream decoder to maintain consistency between the encoder and the decoder.

26 Claims, 4 Drawing Sheets

(51) Int. Cl.
 H04N 11/04    (2006.01)
 H04N 19/117   (2014.01)
 H04N 19/119   (2014.01)
 H04N 19/176   (2014.01)
 H04N 19/70    (2014.01)
 H04N 19/136   (2014.01)
 H04N 19/186   (2014.01)
 H04N 19/156   (2014.01)
 H04N 19/82    (2014.01)
 H04N 19/86    (2014.01)
 H04N 19/56    (2014.01)

(52) U.S. Cl.
 CPC ........... *H04N19/156* (2014.11); *H04N 19/176* (2014.11); *H04N 19/186* (2014.11); *H04N 19/56* (2014.11); *H04N 19/70* (2014.11); *H04N 19/82* (2014.11); *H04N 19/86* (2014.11); *H04N 19/865* (2014.11)

(56) References Cited

U.S. PATENT DOCUMENTS

| | | | | |
|---|---|---|---|---|
| 2001/0020906 | A1* | 9/2001 | Andrews et al. | 341/94 |
| 2003/0206587 | A1* | 11/2003 | Gomila | 375/240.12 |
| 2004/0101059 | A1 | 5/2004 | Joch et al. | |
| 2005/0013363 | A1 | 1/2005 | Cho et al. | |
| 2006/0018386 | A1* | 1/2006 | Bjontegaard | 375/240.25 |
| 2006/0115002 | A1 | 6/2006 | Kim et al. | |
| 2006/0126962 | A1 | 6/2006 | Sun | |
| 2006/0146941 | A1 | 7/2006 | Cha et al. | |
| 2006/0294171 | A1 | 12/2006 | Bossen et al. | |
| 2009/0074070 | A1 | 3/2009 | Yin et al. | |

OTHER PUBLICATIONS

Definitions, separately. Dictionary.com Dictionary.com Unabridged (v 1.1) Random House, Inc. http://dictionary.reference.com/browse/separately.

Definitions, separately. Dictionary.com The American Heritage® Dictionary of the English Language, Fourth Edition, Houghton Mifflin Company, 2004. http://dictionary.reference.com/browse/separately.

Weigand, Thomas Text of Final Committee Draft of Joint Video Specification (ITU-T Rec. H.264 | ISO/IEC 14496-10 AVC) Jul. 2002 pp. 37-39, 73-81.

Puri, A. et al. "Video Coding Using the H.264/MPEG-4 AVC Compression Standard." Signal Processing Image Communication, Elsevier Science Publisher, Amberstamd, NL. vol. 19, No. 9, pp. 793-849. Oct. 1, 2004.

He, J. et al. "Disabling SVC Chroma Deblocking." 21. JVT Meeting 78. MPEG Meeting Oct. 20, 2006-Oct. 27, 2006. Hangzhou, CN. No. JVT-U020, Oct. 16, 2006.

He, Z. "Simplified H.264|AVC Deblocking Filter for SVC ENH Layer." 23, JVT Meeting. 80. MPEG Meeting, Apr. 21, 2007-Apr. 27, 2007. San Jose CR., US. No. JVT-W069 Apr. 19, 2007.

EP Application No. 07798752.7-1905, Office Action—Rejection, mailed Jul. 23, 2015.

* cited by examiner

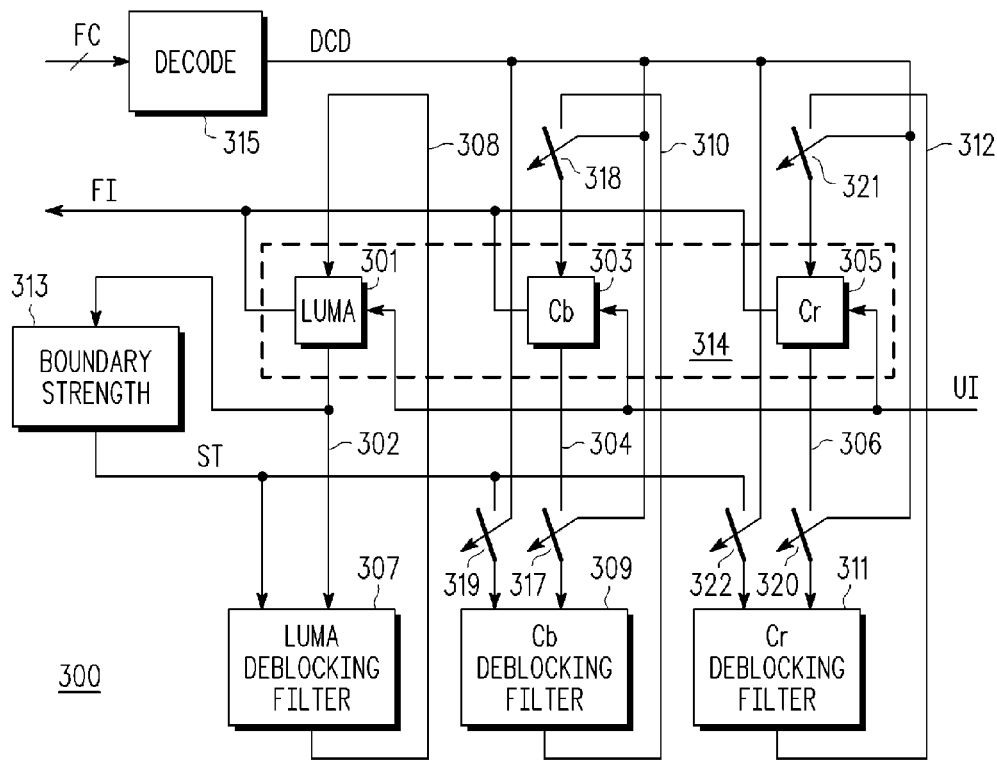
FIG. 3
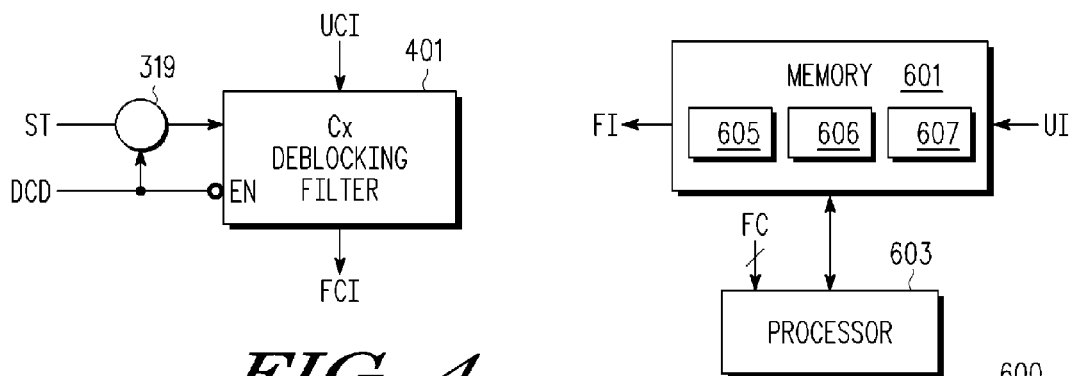
FIG. 4
FIG. 6
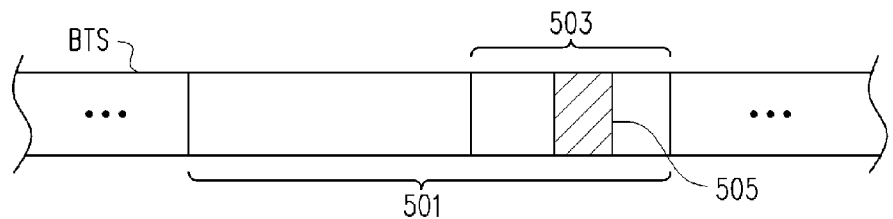
FIG. 5

VIDEO INFORMATION PROCESSING SYSTEM WITH SELECTIVE CHROMA DEBLOCK FILTERING

CROSS-REFERENCE TO RELATED APPLICATIONS

This application is a continuation of copending and commonly assigned U.S. application Ser. No. 11/532,417, filed on Sep. 15, 2006, with at least one common inventor, and which is herein incorporated by reference for all intents and purposes.

BACKGROUND OF THE INVENTION

1. Field of the Invention

The present invention relates in general to video information processing, and more specifically to reducing video information encoding and decoding computational complexity by selectively disabling the chroma deblocking filter.

2. Description of the Related Art

The Advanced Video Coding (AVC) standard, Part 10 of MPEG4 (Motion Picture Experts Group), otherwise known as H.264, includes advanced compression techniques that were developed to enable transmission of video signals at a lower bit rate or storage of video signals using less storage space. The newer standard outperforms video compression techniques of prior standards in order to support higher quality streaming video at lower bit-rates and to enable internet-based video and wireless applications and the like. The standard does not define the CODEC (encoder/decoder pair) but instead defines the syntax of the encoded video bitstream along with a method of decoding the bitstream. Each video frame is subdivided and encoded at the macroblock (MBs) level, where each MB is a 16×16 block of pixels. Each MB is encoded in 'intraframe' mode in which a prediction MB is formed based on reconstructed MBs in the current frame, or 'interframe' mode in which a prediction MB is formed based on the MBs of the reference frames. The intraframe coding mode applies spatial information within the current frame in which the prediction MB is formed from samples in the current frame that have previously encoded, decoded and reconstructed. The interframe coding mode utilizes temporal information from previous and/or future reference frames to estimate motion to form the prediction MB. A video "slice" incorporates one or more macroblocks.

Scalable Video Coding (SVC) is an extension of the H.264 standard which addresses coding schemes for reliably delivery of video to diverse clients over heterogeneous networks using available system resources, particularly in scenarios where the downstream client capabilities, system resources, and network conditions are not known in advance, or dynamically changing from time to time. SVC provides multiple levels of scalability including temporal scalability, spatial scalability, complexity scalability and quality scalability. Temporal scalability generally refers to the number of frames per second (fps) of the video stream, such as 7.5 fps, 15 fps, 30 fps, etc. Spatial scalability refers to the resolution of each frame, such as common interface format (CIF) with 352 by 288 pixels per frame, or quarter CIF (QCIF) with 176 by 144 pixels per frame, although other spatial resolutions are contemplated, such as 4CIF, QVGA, VGA, SVGA, D1, HDTV, etc. Complexity scalability generally refers to the various computational capabilities and processing power of the devices processing the video information. Quality scalability generally refers to the visual quality levels of the coded video by using different bitrates. Objectively, visual quality is measured with a peak signal-to-noise (PSNR) metric defining the relative quality of a reconstructed image compared with an original image.

A deblocking filter is a formative part of the H.264 standard and SVC extension, and an informative part (as a post processing block) of the earlier H.263 standard and MPEG4-Part2. The deblocking filter performs both luma and chroma filtering as known by those of ordinary skill in the art. The deblocking filter used either as an in-loop filter as part of the standard (e.g., H264/AVC), or as a post-processor for video decoder (e.g., H263, MPEG4-part2, MPEG-2, etc.). The deblocking filter enhances the decoded picture quality and increases the encoding efficiency by removing the block effects in the boundary of each 4×4, 8×8, and/or 16×16 block. The deblocking filter, however, also consumes a significant amount of power. Generally speaking, the entire deblocking filter (both luma and chroma) consumes approximately 8% of the computations at the encoder and approximately 35% at the decoder for H264/AVC. Disabling the entire deblocking filter, therefore, provides a significant reduction of complexity, especially in the decoder. A conventional configuration according to H264/AVC includes the ability to turn on and off the entire deblocking filter (luma and chroma). Disabling the entire deblocking filter, however, causes a substantial degradation in both objective PSNR and subjective visual quality especially for the large motion video. In most conventional configurations, the ability to completely disable the deblocking filter has not been used.

It is desired to improve the efficiency of a video information processing system for processing various types of video information including video, images, image sequences, etc. It is desired to reduce the computational complexity of a video information encoder or decoder.

BRIEF DESCRIPTION OF THE DRAWINGS

The benefits, features, and advantages of the present invention will become better understood with regard to the following description, and accompanying drawings where:

FIG. 3 is a simplified block diagram of a deblocking filter that may be used as either or both of the deblocking filters of the encoder of FIG. 1 and/or the decoder of FIG. 2 according to a hardware configuration;

FIG. 4 is a simplified block diagram illustrating a hardware-based chroma deblocking filter with an enable input;

FIG. 5 is a simplified block diagram depicting deblocking filter control information provided in the bitstream output from the encoder of FIG. 1 and provided to the decoder of FIG. 2 according to an exemplary embodiment of the present invention;

FIG. 6 is a block diagram illustrating an alternative configuration of the deblocking filter of FIG. 3 using a memory coupled to a processor;

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present disclosure describes video information processing systems according to exemplary embodiments of the present invention. It is intended, however, that the present disclosure apply more generally to any "video information" incorporating luma and chroma information, which includes video (e.g. MPEG), image, or image sequencing, such as, for example, JPEG (Joint Photographic Experts Group), motion JPEG (MJPEG), JPEG2000, motion JPEG2000 (MJPEG2000), etc. The term "video information" as used herein is intended to apply to any video or image or image sequence information incorporating luma and chroma information.

Simulation results have revealed that disabling luma deblocking filter alone (while enabling the chroma deblocking filter) normally causes a relatively large degradation in both objective PSNR and subjective visual quality especially for video with a relatively large amount of motion. The luma deblocking filter is particularly useful for low bit rate video applications, such as less than 384 kilobits per second (kbps). The simulation results have also revealed, however, that disabling the chroma deblocking filter alone (while enabling the luma deblocking filter) results in a relatively small or negligible degradation in both objective and subjective visual quality. The present disclosure describes a system and method for reducing the computational complexity for video information processing without significant visual quality degradation by disabling the chroma deblocking filter alone.

Figure 1:
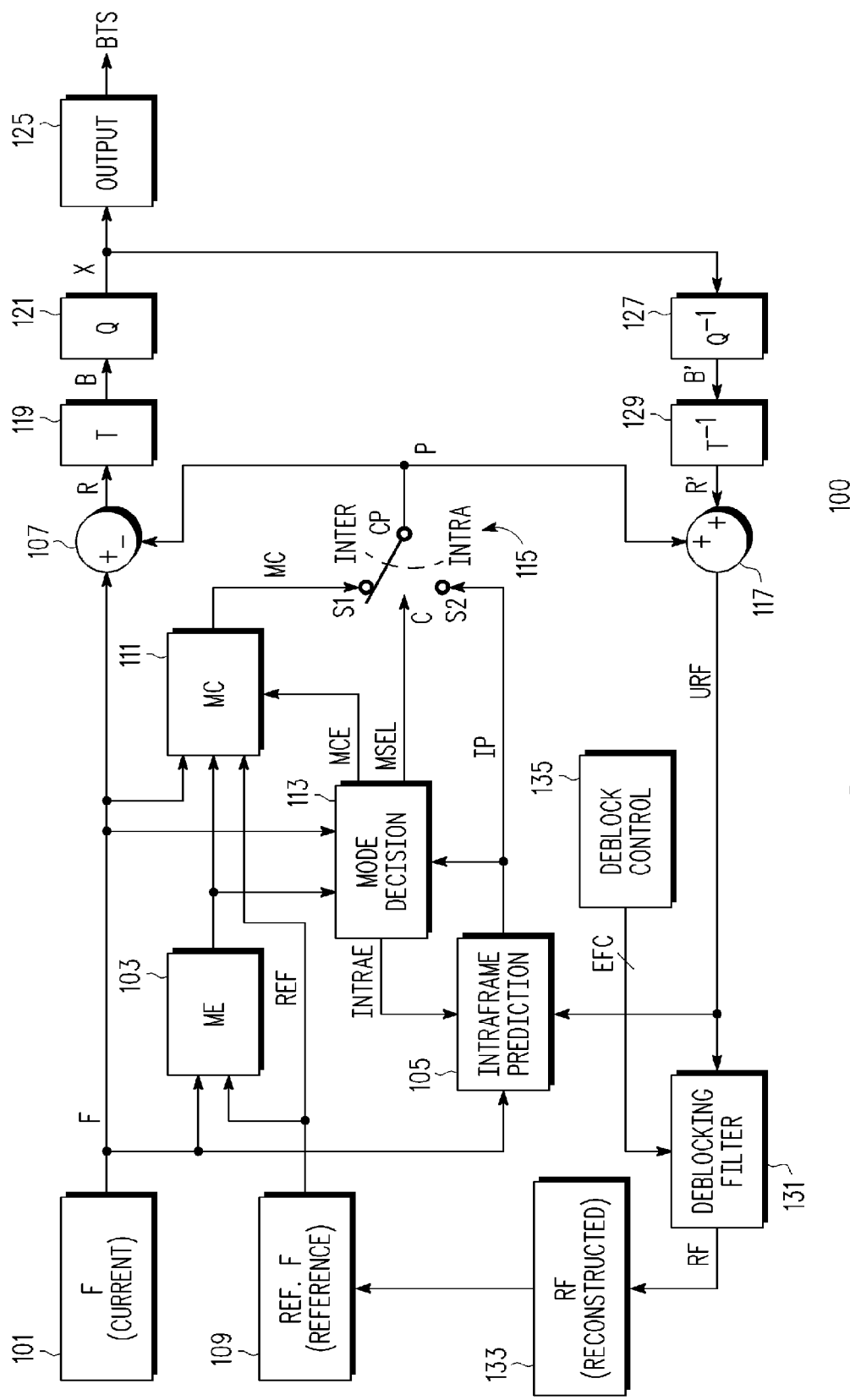
FIG. 1 is a simplified block diagram of a video encoder implemented according to an exemplary embodiment of the present invention.

FIG. 1 is a simplified block diagram of a video encoder 100 implemented according to an exemplary embodiment of the present invention. A frame buffer 101 provides, for purposes of encoding, current frame information F to one input of a motion estimation (ME) circuit 103, to one input of an intraframe prediction circuit 105, to a positive input of a combiner 107 (e.g., adder or subtractor or the like), to one input of a motion compensation (MC) circuit 111, and to an input of a mode decision circuit 113. Another frame buffer 109 provides reference information (REF) to another input of the ME circuit 103 and to another input of the MC circuit 111. The encoder 100 is typically configured to process information one macroblock at a time, so that the frame information F is usually processed one macroblock at a time, although alternative configurations are contemplated. The reference information REF includes information from one or more previously encoded and decoded frames that have further been filtered, such as by a deblocking filter. In conventional configurations, the deblocking filter was optionally enabled or disabled. In the encoder 100, a deblocking filter 131 is provided which is modified in accordance with an embodiment of the present invention. In particular, the chroma filtering performed within the deblocking filter 131 is selectively disabled to reduce computational complexity of the encoder 100.

The ME circuit 103 provides motion estimation information at its output, which is provided to another input of the MC circuit 111 and to another input of the mode decision circuit 113. The mode decision circuit 113 has one output providing an intraframe enable signal INTRAE to an enable input of the intraframe prediction circuit 105, and another output providing a motion compensation enable signal MCE to an enable input of the MC circuit 111. The MC circuit 111 provides motion compensated prediction information (e.g., interframe prediction) MC to a first input terminal S1 of a selector switch 115, illustrated as a single-pole, double-throw (SPDT) switch having input terminals S1 and S2, control input terminal C and a common terminal CP. The common terminal CP provides information from a selected input (S1 or S2) as its output as controlled by the control input terminal C. The intraframe prediction circuit 105 provides intraframe prediction information (e.g., intraframe prediction) IP to an input of the mode decision circuit 113 and to the input terminal S2 of the switch 115. The mode decision circuit 113 provides a mode decision select signal MSEL to the control terminal C of the switch 115 for selecting between the motion compensated prediction information MC or the intraframe prediction information IP.

The CP terminal of the switch 115 provides selected prediction information P to a negative input of the combiner 107 and to a positive input of another combiner 117, which is an adder in the illustrated embodiment. The combiner 107 subtracts the selected prediction information P from the current information F of a current frame to provide residual information R to the input of a transform circuit 119. The transform circuit 119 performs a block transform, such as discrete cosine transform (DCT) or the like, and outputs the transform result B. The transform result B is provided to a quantization (Q) circuit 121, which outputs quantized transform coefficients X. The X coefficients are provided to the input of an output processing circuit 125, which provides a compressed bitstream (BTS) for transmission or storage. The output processing circuit 125 performs additional functions for converting the X coefficients into the bitstream BTS, such as scanning, reordering, entropy encoding, etc., as known to those skilled in the art.

The X coefficients are fed back to the input of an inverse quantization ($Q^{-1}$) circuit 127, which outputs estimated transformed information B' representing an estimated or reconstructed version of the transform result B. The estimated transformed information B' is provided to the input of an inverse transform ($T^{-1}$) circuit 129, which outputs estimated residual information R' representing a reconstructed version of the residual information R. The reconstructed residual information R' is provided to another positive input of the combiner 117. In the embodiment shown, the combiner 117 adds P to R' to generate unfiltered reconstructed information URF. The unfiltered reconstructed frame information URF is provided to another input of the intraframe prediction circuit 105 and to an input of the deblocking filter 131. The deblocking filter 131 filters the unfiltered reconstructed frame information URF and provides filtered reconstructed information RF to an RF buffer 133. One or two previously encoded and decoded frames from the RF buffer 133 are provided to the frame storage 109 to serve as the reference frame information REF as previously described.

A deblock control circuit 135 provides an encoder filter control (EFC) signal to the deblocking filter 131. In conventional configurations, the deblocking filter 131 is turned completely on or completely off (or otherwise disabled). If the deblocking filter 131 is turned off, then the unfiltered reconstructed frame information URF is passed as the reconstructed information RF in which filtering is bypassed (i.e., RF is the same as URF). As described further below, the EFC signal is configured to partially deactivate the deblocking filter 131 so that it only performs luma filtering in which chroma filtering is deactivated. The EFC signal may be a single binary signal or bit if only enabling or disabling chroma deblock filtering. Alternatively, the EFC signal includes multiple signals or bits for selecting between fully enabled, fully disabled, or for disabling chroma deblock filtering alone while luma deblock filtering remains enabled.

Figure 2:
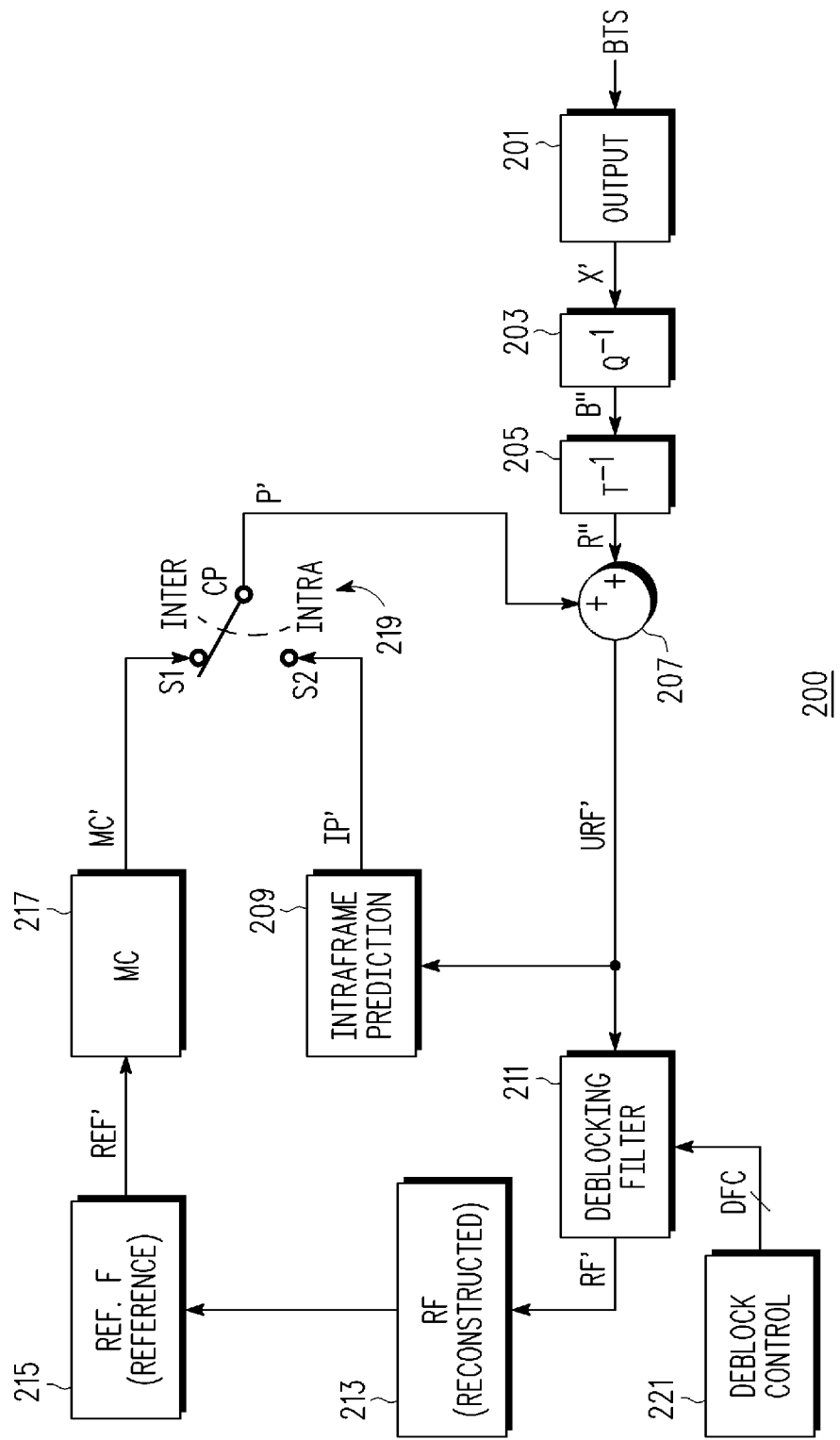
FIG. 2 is a simplified block diagram of a video decoder implemented according to an exemplary embodiment of the present invention.

FIG. 2 is a simplified block diagram of a video decoder 200 implemented according to an exemplary embodiment of the present invention. The compressed bitstream BTS transmitted by the encoder 100 is conveyed through a channel (not shown) and provided to the input of an input processing circuit 201, which performs inverse processing functions of the output processing circuit 125 of the encoder 100, such as inverse scanning, reordering, entropy decoding, etc., as known to those skilled in the art. The input processing circuit 201 outputs quantized transform coefficients X' coefficients, which are intended to duplicate the X coefficients of the encoder 100. The X' coefficients are provided to the input of an inverse quantization circuit 203, which outputs estimated transformed information B". The estimated transformed information B" is provided to the input of an inverse transform circuit 205, which outputs reconstructed residual information R" to a positive input of a combiner 207. In the embodiment shown, the combiner 207 adds selected prediction information P' to R" to generate unfiltered reconstructed information URF'. The unfiltered reconstructed frame information URF' is provided to an input of an intraframe prediction circuit 209 and to an input of a deblocking filter 211. The deblocking filter 211 filters the unfiltered reconstructed frame information URF' and provides filtered reconstructed information RF' to an RF buffer 213.

One or two previously encoded and decoded (and selectively filtered) frames from the RF buffer 213 are provided to a frame storage 215, which provides reference information REF' to the input of a motion compensation (MC) circuit 217. The MC circuit 217 provides motion compensated prediction information MC' to a first input terminal S1 of a selector switch 219, illustrated as a SPDT switch, having input terminals S1 and S2 and a common terminal CP providing a selected input as its output. The intraframe prediction circuit 209 provides intraframe prediction information IP' to the input terminal S2 of the switch 219. The switch 219 selects between the motion compensated prediction information MC' and the intraframe prediction information IP' and provides the selected prediction information P'. The input bitstream BTS provides mode information for controlling the switch 219 for selecting between interframe and intraframe prediction information as known to those of ordinary skill in the art.

Similar to the encoder 100, the decoder 200 generally processes information one macroblock at a time. Also, the deblocking filter 211 is configured in a similar manner as the deblocking filter 131, and includes a similar decoder filter control DFC signal provided by a deblock control circuit 221. As with the deblocking filter 131, if the deblocking filter 211 is turned off, then the unfiltered reconstructed frame information URF' is passed as the "filtered" reconstructed information RF' in which filtering is bypassed. In a similar manner as the EFC signal controlling the state of the deblocking filter 131, the DFC signal is asserted by the deblock control circuit 221 to partially deactivate the deblocking filter 211 so that it only performs luma filtering in which chroma filtering is deactivated. To ensure equivalency of data between the encoder 100 and the decoder 200, the encoder 100 asserts control bits in the bitstream BTS received by the decoder 200 to control the activation state of the deblocking filter 211. In particular, the state of the deblocking filter 211 within the decoder 200 is controlled to have the same state as the state of the deblocking filter 131 within the encoder 100 for the same data to improve coding efficiency and confine error drifting. For example, if the deblock control circuit 135 of the encoder 100 controls the EFC signal to disable chroma filtering for a particular slice or frame of URF information being processed in the encoder 100, then the encoder 100 provides control information within the bitstream BTS to cause the deblock control circuit 221 of the decoder 200 to provide the DFC signal to disable chroma filtering for a corresponding slice or frame of URF' information being processed in the decoder 200.

FIG. 3 is a simplified block diagram of a deblocking filter 300 that may be used as either or both of the deblocking filters 131 and 211 according to an exemplary hardware configuration. An unfiltered information (UI) signal is provided to respective inputs of a luma buffer 301, a first chroma component (Cb) buffer 303, and a second chroma component (Cr) buffer 305 of a memory 314 including one or more memory devices. The memory 314 may be implemented using a single memory device with separately addressable luma and chroma information or may include multiple memory devices for implementing the separate buffers. The buffers 301, 303 and 305 may be implemented in any suitable manner, such as SRAM (static random access memory), SDRAM (synchronous dynamic RAM), registers, shift devices, etc. As known by those of ordinary skill in the art, the Cb chroma component is a blue color luma difference and the Cr chroma component is a red color luma difference. The UI signal represents either the URF signal for the deblocking filter 131 or the URF' signal for the deblocking filter 211. The UI signal provides luma information for temporary storage in the luma buffer 301, Cb chroma component information for temporary storage in the Cb buffer 303, and Cr chroma component information for temporary storage in the Cr buffer 305. Each of the buffers 301, 303 and 305 has an output providing corresponding filtered luma and chroma component information via a filtered information (FI) signal, which represents the "filtered" reconstructed information RF for the deblocking filter 131 or the "filtered" reconstructed information RF' for the deblocking filter 211. In a similar manner as described previously, if the filters of the deblocking filter 300 are completely turned off or disabled, then the UI and FI signals incorporate the same information.

The luma buffer 301 is shown with a separate output coupled via signal line 302 to an input of a luma deblocking filter 307, which has an output coupled via signal line 308 to another input of the luma buffer 301. In a similar manner, the Cb buffer 303 is shown with a separate output coupled via signal line 304 to an input of a Cb deblocking filter 309, which has an output coupled via signal line 310 to another input of the Cb buffer 303. Also, the Cr buffer 305 is shown with a separate output coupled via signal line 306 to an input of a Cr deblocking filter 311, which has an output coupled via signal line 312 to another input of the Cr buffer 305. The signal line 302 at the output of the luma buffer 301 is also provided to an input of a boundary strength circuit 313, having an output providing a strength (ST) signal to respective inputs of the filters 307, 309 and 311. A filter control signal (FC) is provided to a decode circuit 315, having an output providing a disable chroma deblocking (DCD) signal to control inputs of single-pole, single-throw (SPST) switches 317, 318, 319, 320, 321 and 322. The FC signal represents either the EFC signal of the encoder 100 or the DFC signal of the decoder 200, and may include one or more binary signals as previously described. The switches 317-322 are shown as SPST switches, but may be implemented in any suitable fashion, such as electronic switches or transistors or the like. The switch 317 has its switched terminals coupled in the signal path of the signal line 304, switch 318 has its switched terminals coupled in the signal path of the signal line 310, switch 319 has its switched terminals coupled between the signal ST and the corresponding input of the Cb deblocking filter 309, switch 320 has its switched terminals coupled in the signal path of the signal line 306, switch 321 has its switched terminals coupled in the signal path of the signal line 312, and switch 322 has its switched terminals coupled between the signal ST and the corresponding input of the Cr deblocking filter 311. In this manner, the first set of three switches 317-319 selectively couple the Cb buffer 303 to the Cb deblocking filter 309 and the boundary strength circuit 313, and the second set of three switches 320-322 selectively couple the Cr buffer 305 to the Cr deblocking filter 311 and the boundary strength circuit 313, both based on the state of the DCD signal. Although not shown, another set of three switches may be coupled in a corresponding manner for selectively coupling the luma buffer 301 to the luma deblocking filter 307 and the boundary strength circuit 313 (e.g., for disabling all of the deblocking filters).

In operation when the deblocking filter 300 is fully enabled, the luma, Cb and Cr components from the next block of information delivered via the UI signal is loaded into the luma buffer 301, the Cb buffer 303 and the Cr buffer 305, respectively. The luma information in the luma buffer 301 is processed by the boundary strength circuit 313 to calculate boundary strength information, which is used to develop the ST signal. In one embodiment, the boundary strength circuit 313 calculates boundary strength of 4×4 sub-blocks in the horizontal and vertical directions, and may use other information, such as a quantization parameter or the like, to perform the calculation. The ST signal is used to select from among multiple filters in each of the deblocking filters 307, 309 and 311. In one embodiment, the filters 307, 309 and 311 are each configured as lookup tables or the like storing filter coefficients for each filter selected by the ST signal. When the DCD signal is negated low, each of the switches 317-322 are closed thereby coupling the buffers 301, 303 and 305 with the filters 307, 309 and 311, respectively, and couples the filters 307, 309 and 311 to the boundary strength signal ST. When the deblocking filter 300 is fully enabled and the DCD signal is negated low, the luma information from the luma buffer 301 is provided via the signal line 302 to the selected filter within the luma deblocking filter 307, the Cb component information from the Cb buffer 303 is provided via the signal line 304 to the selected filter within the Cb deblocking filter 309, and the Cr component information from the Cr buffer 305 is provided via the signal line 306 to the selected filter within the Cr deblocking filter 311. The filtered luma information from the deblocking filter 308 is provided back to the luma buffer 301 via the signal line 308, the filtered Cb component information from the Cb deblocking filter 309 is provided back to the Cb buffer 303 via the signal line 310, and the filtered Cr component information from the Cr deblocking filter 311 is provided back to the Cr buffer 305 via the signal line 312. After the filtering process is completed, the filtered information from the luma, Cb and Cr buffers 301, 303 and 305, respectively, is provided to respective portions of the FI signal at the output of the deblocking filter 300.

When the DCD signal is asserted high, the switches 317-322 are all opened so that the Cb and Cr buffers 303 and 305 are disconnected from the Cb and Cr deblocking filters, respectively. The information from the UI signal is loaded into the buffers 301, 303 and 305 in the same manner. The luma information from the luma buffer 301 is filtered by the luma deblocking filter 308 and provided back into the luma buffer 301 in a similar manner as previously described. The Cb and Cr component information, however, is not filtered and remains unmodified since the filters 309 and 311 are disconnected and disabled. The filtered luma information along with the unfiltered Cb and Cr component information is incorporated into the FI signal, so that the FI signal represents partially filtered information. The ST signal is also disconnected from the Cb and Cr deblocking filters 309 and 311 via the opened switches 319 and 322, respectively. In this manner, the Cb and Cr deblocking filters 309 and 311 are effectively disabled and do not filter the chroma information when the DCD signal is asserted high. The disabling of the chroma filtering in this manner significantly reduces computational complexity and reduces data loading overhead in the deblocking filter 300. The computational complexity and loading overhead reductions are available in either or both the encoder 100 and the decoder 200.

The hardware-based deblocking filter 300 is only one specific example of many different hardware configurations in which many variations are possible and contemplated. For example, the Cb and Cr deblocking filters 309 and 311 are shown as separate filters, although a single, common chroma deblocking filter (not shown) may be used for both. A common chroma filter could potentially reduce size and power consumption of the overall circuit, although possibly at the cost of additional processing cycles when chroma deblock filtering is enabled since the Cb and Cr components are processed separately. The switches 317-322 generally operate to decouple the buffers from the filters, whereas in alternative configurations one or more of the buffers may be completely bypassed. In one alternative embodiment (not shown), only the luma information from the UI signal is loaded into the buffer 301, so that there is no data loading of the chroma information into the Cb and Cr buffers 303 and 305 from the UI signal. One or more switching devices (not shown) may be used to bypass both buffering and deblock filtering of the chroma information. Alternatively, the process of loading the buffers 303 and 305 may be bypassed altogether when chroma deblock filtering is disabled. Avoiding buffer loading reduces processing cycles and power consumption.

FIG. 4 is a simplified block diagram illustrating a hardware-based chroma deblocking filter 401 with an enable input. In this case, the chroma deblocking filters 309 and/or 311 may be implemented with an enable input as shown by Cx deblocking filter 401, where "Cx" denotes either Cb or Cr or a common deblocking filter used for both. The DCD signal is provided to an inverted enable input of the Cx deblocking filter 401, so that the filter 401 is disabled when the DCD signal is asserted high to disable chroma filtering or otherwise enabled when the DCD signal is asserted low to enable chroma filtering. The DCD signal may still be provided to a control input of the switch 319 (and 322) for selectively coupling the ST signal to each of the Cx deblocking filter(s) 401 as previously described. The Cx deblocking filter 401 includes a data input receiving unfiltered chroma information (UCI) and a data output providing filtered component information (FCI). Selective disabling may be implemented in any suitable manner, such as decoupling either one or both power and ground of the filter circuitry to minimize power consumption. When the Cx deblocking filter 401 is disabled, it is either bypassed or UCI is passed unmodified to the FCI.

In the 4:2:0 sub-sampling scheme or video format, each of the chroma components Cb and Cr has a quarter amount of data of the luma component (Y). Each of the chroma component Cb or Cr has half of the luma samples horizontally and vertically. For QCIF of 176×144 pixels for the 4:2:0 format, for example, each frame has a luma component size of Y=176×144, a chroma Cb component size of Cb=88×72, and a Cr component size of Cr=88×72. In the H.264/AVC and SVC standards, the deblocking filter is applied to all 4×4 or 8×8 block edges within each 16×16 macroblock in a frame, except for the edges at the boundary of the picture and any edges for which the deblocking filter process is disabled by a disabling flag specified in the H264/AVC and SVC standards.

According to the H.264 standard document, the deblocking filtering process for the H.264/AVC and SVC standards is generally performed on a macroblock basis, with all macroblocks in each frame processed in order of increasing macroblock address. Prior to the operation of the deblocking filter process for each macroblock, the deblocked samples of the macroblock or macroblock pair above (if any) and the macroblock or macroblock pair to the left (if any) of the current macroblock are made available. The deblocking filter process is invoked for the luma and chroma components separately. For each macroblock, vertical edges are filtered first, from left to right, and then horizontal edges are filtered from top to bottom. The luma deblocking filter process is performed on four 16-sample edges and the deblocking filter process for each chroma components is performed on two 8-sample edges, for both the horizontal direction and the vertical direction. Sample values above and to the left of the current macroblock that may have already been modified by the deblocking filter process operation on previous macroblocks are used as input to the deblocking filter process on the current macroblock and may be further modified during the filtering of the current macroblock. Sample values modified during filtering of vertical edges are used as input for the filtering of the horizontal edges for the same macroblock.

FIG. 5 is a simplified block diagram depicting deblocking filter control information provided in the bitstream BTS output from the encoder 100 and provided to the decoder 200 according to an exemplary embodiment of the present invention. The encoder 100 asserts the EFC signal to locally control the state of the deblocking filter 131 for particular video information being encoded. The encoder 100 generates the bitstream BTS provided to the decoder 200, where the bitstream BTS includes one or more slices of encoded information. Each slice includes one or more macroblocks of encoded information and includes a slice header. As shown, the bitstream BTS includes a slice 501 having a slice header 503. In the embodiment illustrated, the slice header 503 includes a deblocking filter control field 505 (shown shaded), which includes one or more deblocking filter control bits. It is noted that if the filter control field 505 is not present, then the decoder 200 uses a default configuration in which the deblocking filter 131 is fully enabled to perform both luma and chroma deblock filtering. In a conventional H264 or SVC configuration, the deblocking filter control field 505 includes a parameter in the range of [0,2] for controlling the state of the deblocking filter of the decoder. The conventional parameter has a state of 0 to indicate that the deblocking filter 211 is to be fully enabled. A state of 1 indicates that the deblocking filter 211 is to be completely disabled, including the luma deblocking filter 307. A state of 2 indicates that the deblocking filter 311 is to be fully enabled except on slice boundaries. A state of 3 was previously undefined in conventional configurations and not used.

In one embodiment, the undefined state of 3 is re-defined to indicate disabling of the Cb and Cr chroma deblocking filters 309 and 311 while the luma deblocking filter 307 remains enabled. In another embodiment, a separate chroma deblocking control bit is added to the deblocking filter control field 505 of the slice header 503. The state of the chroma deblocking control bit determines the state of the Cb and Cr deblocking filters 309 and 311 of the deblocking filter 211 of the decoder 200. For example, the chroma deblocking control bit is negated low to enable chroma filtering and asserted high to disable chroma filtering, or vice-versa.

FIG. 6 is a block diagram illustrating a deblocking filter 600 according to an alternative embodiment of the present invention. The deblocking filter 600 includes a memory 601 coupled to a processor 603, which is coupled to the memory 601 in any suitable manner as known to those skilled in the art, such as a bus structure or the like. The processor 603 is configured in any suitable manner, such as a microcontroller or microprocessor or the like, for executing any form of code, such as any combination of firmware or software and the like. The memory 601 may be configured in a similar manner as the memory 314 receiving unfiltered video information from the UI signal and providing filtered video information on the FI signal. As shown, the memory 601 stores a luma component 605, a Cb chroma component 606, and a Cr chroma component 607 received from the UI signal. The data loading between the memory 601 and the UI and FI signal may be controlled by the processor 603. The processor 603 is programmed or otherwise configured to perform the functions of the boundary strength circuit 313 and each of the deblocking filters 307, 309 and 311 when enabled. The FC signal is shown provided to the processor 603 for controlling deblock filtering as previously described, such as disabling deblock filtering altogether or only disabling chroma deblock filtering. The FC signal may also be used to inform the processor 603 to control the data loading from the UI signal to memory 601. For example, if the chroma deblocking filtering is disabled, there might be no data loading for Cb and Cr from UI (or any external memory) to the buffer 601.

Figure 7:
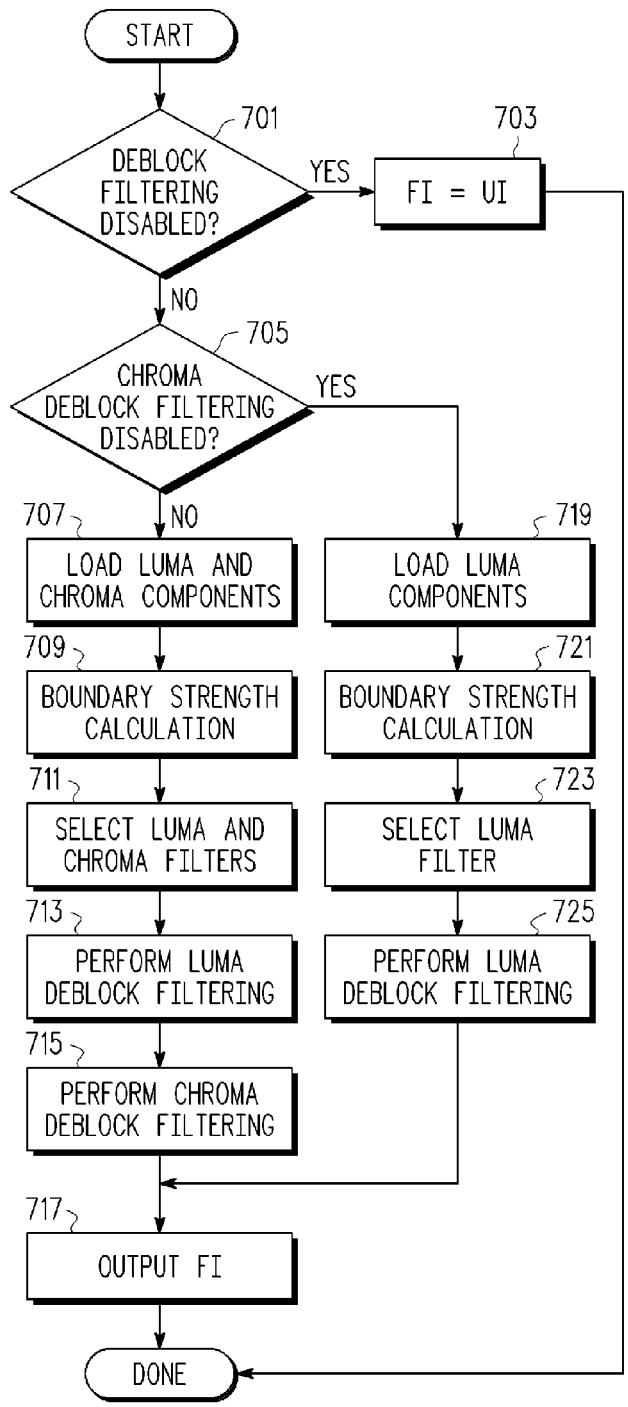
FIG. 7 is a flowchart diagram illustrating exemplary operation of the processor of FIG. 6.

FIG. 7 is a flowchart diagram illustrating exemplary operation of the processor 603 when performing deblock filtering functions of the deblocking filter 600. In various configurations, the processor 603 may further be configured to perform encoding functions similar to those described for the video encoder 100 or decoding functions similar to those described for the video decoder 200. At a first block 701, it is queried whether deblock filtering is completely disabled as determined from the FC signal. If so, then operation proceeds to block 703 in which the data from the UI signal is passed to the FI signal denoted as FI=UI. In this case, a significant amount of processing is bypassed including all processing cycles associated with loading and unloading the memory 601 and performing deblock filtering for both luma and chroma information. As previously described, however, completely disabling deblock filtering potentially results in a significant degradation of video quality.

If deblock filtering is not fully disabled as determined at block 701, then operation proceeds instead to block 705 in which it is queried, as determined by the FC signal, whether only chroma deblock filtering is disabled (while luma deblock filtering remains enabled). If not, then deblock filtering is fully enabled and operation proceeds to block 707 in which the luma and chroma components 605-607 are loaded into the memory 601. Operation then proceeds to block 709 in which the boundary strength calculation is performed by the processor 601. The luma component 605 is accessed by or otherwise loaded into the processor 601 to perform the boundary strength calculation. Operation then proceeds to block 711 in which the luma and chroma deblocking filters are selected by the processor 601 based on the boundary strength calculation. Operation then proceeds to block 713 in which luma deblock filtering is performed on the luma component 605. Again, the luma component 605 is accessed by or otherwise loaded into the processor 601 and filtered according to the selected luma deblocking filter and the filtered information is loaded back into the memory 601. Operation then proceeds to block 715 in which chroma deblock filtering is performed on the chroma components 606 and 607. In this case, each of the chroma components 606 and 607 is accessed by or otherwise loaded into the processor 601 and filtered according to the selected chroma deblocking filters for the Cb and Cr components and the filtered information is loaded back into the memory 601. Operation then proceeds to block 717 in which the filtered luma and chroma component information is provided on the FI signal.

Referring back to block 705, if only chroma deblock filtering is disabled, operation proceeds instead to block 719 in which the luma component 719 is loaded into the memory 601. In this case, the processing cycles of loading the chroma components 606 and 607 into the memory 601 are avoided thereby reducing processing cycles. It is noted, however, that loading the chroma components 606 and 607 into the memory 601 may be performed in an alternative configuration or under certain conditions if necessary or desired for any reason. Operation then proceeds to block 721 in which the boundary strength calculation is performed by the processor 601 in a similar manner as described above for block 709. Operation then proceeds to block 723 in which the luma deblocking filter is selected by the processor 601. In this case, there is no need to select the chroma deblocking filters since chroma deblock filtering is disabled thereby saving additional processor cycles. Operation then proceeds to block 725 in which luma deblock filtering is performed on the luma component 605. In a similar manner previously described for block 713, the luma component 605 is accessed by or otherwise loaded into the processor 601 and filtered according to the selected luma deblocking filter and the filtered information is loaded back into the memory 601. At this point, operation proceeds directly to block 717 in which the filtered luma component information is provided on the FI signal. The filtered luma component information may also be written back to the luma buffer 605 for computing the boundary strength for deblocking the next block of information. The functions performed for chroma deblock filtering as described for block 715 are completely bypassed thereby providing a substantially reduction in processing cycles and reduced time for deblock filtering since chroma deblock filtering is bypassed. Furthermore, the processing cycles associated with unloading the chroma information from the memory 601 to the FI signal is potentially avoided since not loaded in the first place.

The deblocking filter 600 provides a significant amount of reduction in both processing cycles and power consumption when chroma deblock filtering is disabled. The loading and unloading of data in the memory 601 is significantly reduced and processing cycles associated with chroma deblock filtering are avoided altogether. The disabling of chroma deblock filtering thus provides significant savings without significant degradation of the video information.

Figure 8:
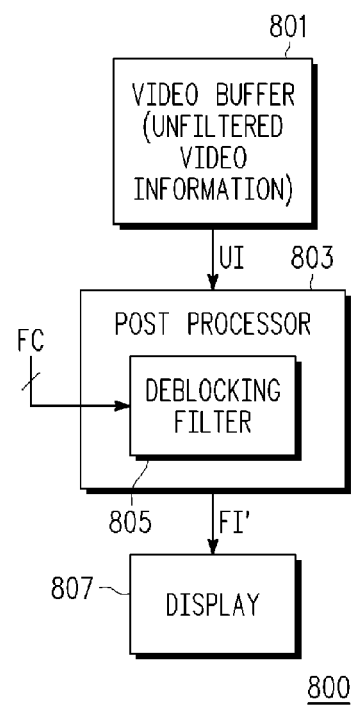
FIG. 8 is a block diagram illustrating an exemplary post processing system in which deblock filtering is performed outside the coding loops.

FIG. 8 is a simplified block diagram of an exemplary post processing system 800. Unfiltered video information is stored in a video buffer 801 having an output coupled to an input of a post processor 803. The post processor 803 includes a deblocking filter 805 receiving the UI signal and providing the FI signal as controlled by the FC signal as previously described. The deblocking filter 805 is configured as either one of the deblocking filters 300 or 600. The post processor 803 may perform additional functions other than deblocking, such as de-ringing, resizing, etc. The output of the post processor 803, shown as a signal FI', is provided to a display device 807. The FI' signal is distinguished relative to the FI signal since additional post processing may be performed. In one embodiment, the unfiltered video information in 801 is unfiltered video information from a video system that does not have loop deblock filtering or in which the deblocking filter is turned completely off. For example, the unfiltered video information may be provided from an H.263 MPEG video system, an MPEG4-Part 2 video system, or and H.264 part 10 video system having its deblocking filter shut completely off. In these cases, the deblocking filter 805 performs post deblock filtering processing on unfiltered data in which the deblocking filter is not provided within the encoding/decoding loop.

A deblocking filter for deblock filtering video information including luma information and chroma information according to an embodiment of the present invention includes a luma deblocking filter, a chroma deblocking filter, and control logic. The luma deblocking filter deblock filters the luma information and the chroma deblocking filter deblock filters the chroma information. The control logic is configured to selectively enable and disable the chroma deblocking filter while the luma deblocking filter is enabled.

A memory may be provided for storing the luma and chroma information. In this case, the control logic may include at least one switching device which selectively decouples the chroma deblocking filter from the memory. The chroma deblocking filter may include an enable input, where the control logic provides an enable signal to the enable input of the chroma deblocking filter. The deblocking filter may further include a boundary strength circuit having an input for receiving the luma information and an output for providing a boundary strength signal, where the chroma deblocking filter has a strength select input receiving the strength signal. In this case, the control logic may include a switch device for selectively decoupling the output of the boundary strength circuit from the strength select input of the chroma deblocking filter. The chroma deblocking filter may include a blue luma difference deblocking filter and a red luma difference deblocking filter. In the dual difference chroma deblocking filter case, the control logic is configured to selectively enable and disable both blue and red luma difference deblocking filters.

In an alternative configuration, the deblocking filter includes a memory for storing the video information and a processor. The processor is configured to implement the luma deblocking filter, the chroma deblocking filter and the control logic, and is configured to selectively disable chroma deblock filtering. The processor may control storing (e.g., loading and unloading) of the video information into the memory, and may be configured to selectively bypass storage of the chroma information in the memory when chroma deblock filtering is disabled.

A video information processing system according to an embodiment of the present invention includes a processing circuit and a deblocking filter. The processing circuit provides video information including a chroma component and a luma component. The deblocking filter has an input receiving the video information and an output providing filtered video information, and is configured to selectively disable chroma deblock filtering while luma deblock filtering is enabled.

The processing circuit may include a video encoder and control logic. The video encoder provides the video information as reconstructed video information. The control logic provides a filter control signal to the deblocking filter to disable chroma deblock filtering and to enable luma deblock filtering while processing the reconstructed video information. In one configuration, the video encoder generates residual information, converts the residual information into the reconstructed video information, encodes the residual information into encoded information within an encoded bitstream, and incorporates control information in the encoded bitstream associated with the encoded information. The control information indicates disabling chroma deblock filtering and enabling luma deblock filtering when processing the encoded information.

In another embodiment, the processing circuit includes a video decoder and control logic. The video decoder provides video information as decoded reconstructed video information, and the control logic provides a filter control signal to the deblocking filter to disable chroma deblock filtering and to enable luma deblock filtering while processing the decoded reconstructed video information. In a more specific configuration, the video decoder is configured to decode an input encoded bitstream into the decoded reconstructed video information and to retrieve control information in the encoded bitstream associated with the decoded reconstructed video information. The control information indicates disabling chroma deblock filtering and enabling luma deblock filtering when processing the decoded reconstructed video information.

In yet another embodiment, the processing circuit may include a memory which stores the video information, where the deblocking filter includes a post processor for filtering the video information.

The deblocking filter may include a luma deblocking filter which deblock filters the luma component, a chroma deblocking filter which deblock filters the chroma component, and control logic which is configured to selectively enable and disable the chroma deblocking filter while the luma deblocking filter is enabled. The deblocking filter may include a memory for storing the video information and a processor configured to perform luma deblock filtering and chroma deblock filtering, where the processor selectively disables chroma deblock filtering.

A method of deblock filtering video information according to an embodiment of the present invention includes receiving unfiltered luma information and unfiltered chroma information, disabling chroma deblock filtering, deblock filtering the unfiltered luma information to provide filtered luma information, and combining the filtered luma information with the unfiltered chroma information into output filtered video information. The method may include decoupling at least one chroma deblocking filter. The method may include decoupling an input and an output of the at least one chroma deblocking filter. The method may include disabling at least one chroma deblocking filter. The method may include decoding a deblock filter control signal into a chroma deblock filtering disable signal.

Although the present invention has been described in considerable detail with reference to certain preferred versions thereof, other versions and variations are possible and contemplated. For example, circuits or logic blocks described herein may be implemented as discrete circuitry or integrated circuitry or software or any alternative configurations. Also, although the present invention has been described herein with respect to video, it is appreciated that the present invention applies more generally to any "video information" incorporating luma and chroma information, such as video (e.g. MPEG and the like), and image, or image sequencing, such as, for example, JPEG, MJPEG, JPEG2000, MJPEG2000, etc. The term "video information" as used herein is intended to apply to any video or image or image sequence information incorporating luma and chroma information. Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. A deblocking filter for deblock filtering video information which includes luma information and chroma information, said deblocking filter comprising:
   a luma deblocking filter which deblock filters said luma information;
   a chroma deblocking filter which deblock filters said chroma information; and
   control logic which is configured to disable said chroma deblocking filter for at least one macroblock of said video information while said luma deblocking filter is enabled for said at least one macroblock of said video information.

2. The deblocking filter of claim 1, further comprising:
   a memory for storing said luma information and said chroma information; and
   wherein said control logic comprises at least one switching device which selectively decouples said chroma deblocking filter from said memory.

3. The deblocking filter of claim 1, wherein said chroma deblocking filter includes an enable input, wherein said control logic provides an enable signal to said enable input of said chroma deblocking filter.

4. The deblocking filter of claim 1, further comprising:
   a boundary strength circuit that receives said luma information and that provides a boundary strength signal; and
   said chroma deblocking filter having a strength select input receiving said strength signal.

5. The deblocking filter of claim 1, wherein said chroma deblocking filter comprises a blue luma difference deblocking filter and a red luma difference deblocking filter, and wherein said control logic is configured to enable and disable said blue and red luma difference deblocking filters.

6. The deblocking filter of claim 1, further comprising:
   a memory for storing said video information; and
   a processor, coupled to said memory, wherein said processor is configured to implement said luma deblocking filter, said chroma deblocking filter and said control logic and to selectively disable chroma deblock filtering.

7. The deblocking filter of claim 6, wherein said processor controls storing of said video information into said memory, and wherein said processor selectively bypasses storage of said chroma information in said memory when chroma deblock filtering is disabled.

8. A video information processing system, comprising:
   a processing circuit for providing video information including a chroma component and a luma component; and
   a deblocking filter having an input receiving said video information and an output providing filtered video information, wherein said deblocking filter is configured to disable chroma deblock filtering for at least one macroblock of said video information while luma deblock filtering is enabled for said at least one macroblock of said video information.

9. The video information processing system of claim 8, wherein said processing circuit comprises:
   a video encoder which provides said video information as reconstructed video information; and
   control logic which provides a filter control signal to said deblocking filter to disable chroma deblock filtering and enable luma deblock filtering while processing said reconstructed video information.

10. The video information processing system of claim 9, wherein said video encoder generates residual information, converts said residual information into said reconstructed video information, encodes said residual information into encoded information within an encoded bitstream, and incorporates control information in said encoded bitstream associated with said encoded information, and wherein said control information indicates disabling chroma deblock filtering and enabling luma deblock filtering.

11. The video information processing system of claim 8, wherein said processing circuit comprises:
 a video decoder which provides said video information as decoded reconstructed video information; and
 control logic which provides a filter control signal to said deblocking filter to disable chroma deblock filtering and enable luma deblock filtering while processing said decoded reconstructed video information.

12. The video information processing system of claim 11, wherein said video decoder is configured to decode an input encoded bitstream into said decoded reconstructed video information and to retrieve control information in said encoded bitstream associated with said decoded reconstructed video information, and wherein said control information indicates disabling chroma deblock filtering and enabling luma deblock filtering.

13. The video information processing system of claim 8, wherein said processing circuit comprises a memory which stores said video information, and wherein said deblocking filter comprises a post processor for filtering said video information.

14. The video information processing system of claim 8, wherein said deblocking filter comprises:
 a luma deblocking filter which deblock filters said luma component;
 a chroma deblocking filter which deblock filters said chroma component; and
 control logic which is configured to selectively enable and disable said chroma deblocking filter while said luma deblocking filter is enabled.

15. The video information processing system of claim 8, wherein said deblocking filter comprises:
 a memory for storing said video information; and
 a processor, coupled to said memory, wherein said processor is configured to perform luma deblock filtering and chroma deblock filtering;
 wherein said processor selectively disables chroma deblock filtering.

16. The video information processing system of claim 8, wherein said processing circuit comprises a video encoder which encodes said video information into at least one macroblock comprising deblocking filter control information indicating disabling chroma deblock filtering while enabling luma deblock filtering.

17. The video information processing system of claim 8, wherein said processing circuit comprises a video decoder which decodes at least one macroblock of encoded information while chroma deblock filtering is disabled and while luma deblock filtering is enabled.

18. The video information processing system of claim 8, wherein said said deblocking filter comprises a blue luma difference deblocking filter and a red luma difference deblocking filter for chroma deblock filtering, and wherein said deblocking filter is configured to enable and disable said blue and red luma difference deblocking filters.

19. A method of deblock filtering at least one macroblock of video information by a video processing system, comprising:
 receiving at least one macroblock of unfiltered luma information and unfiltered chroma information;
 disabling chroma deblock filtering for the at least one macroblock;
 deblock filtering the unfiltered luma information to provide filtered luma information; and
 combining the filtered luma information with the unfiltered chroma information into output filtered video information.

20. The method of claim 19, wherein said disabling chroma deblock filtering comprises decoupling at least one chroma deblocking filter.

21. The method of claim 20, wherein said decoupling a chroma deblocking filter comprises decoupling an input and an output of the at least one chroma deblocking filter.

22. The method of claim 19, wherein said disabling chroma deblock filtering comprises disabling at least one chroma deblocking filter.

23. The method of claim 19, further comprising decoding a deblock filter control signal into a chroma deblock filtering disable signal.

24. The method of claim 19, further comprising encoding the at least macroblock of output filtered video information to include deblocking filter control information which indicates chroma deblock filtering is disabled and luma deblock filtering is enabled for the at least one macroblock.

25. The method of claim 19, further comprising decoding the at least one macroblock of output filtered video information while chroma deblock filtering is disabled and while luma deblock filtering is enabled.

26. The method of claim 19, wherein said disabling chroma deblock filtering comprises disabling at least one of blue luma difference deblock filtering and red luma difference deblock filtering.

* * * * *